(12) United States Patent
Mancosu et al.

(10) Patent No.: US 6,539,788 B1
(45) Date of Patent: Apr. 1, 2003

(54) METHOD FOR DETERMINING PRESELECTED PERFORMANCE CHARACTERISTICS OF A TREAD OF A TIRE AND TIRE PROVIDED WITH A TREAD HAVING OPTIMAL CHARACTERISTICS WITH REFERENCE TO SAID PERFORMANCE CHARACTERISTICS

(75) Inventors: Federico Mancosu, Milan (IT); Giuseppe Matrascia, Seregno (IT); Andrea Devizzi, Paderno Dugnano (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/470,888

(22) Filed: Dec. 22, 1999

Related U.S. Application Data
(60) Provisional application No. 60/113,819, filed on Dec. 23, 1998.

(30) Foreign Application Priority Data

Dec. 22, 1998 (EP) .......................................... 98204413

(51) Int. Cl.⁷ ............................................ G01M 17/02
(52) U.S. Cl. ...................................................... 73/146
(58) Field of Search ............................. 73/7, 8, 9, 146; 395/500.28, 500.29; 152/450, 454, 455, 458; 703/1, 3, 7, 12

(56) References Cited

U.S. PATENT DOCUMENTS
5,371,685 A 12/1994 Bandel et al.
5,777,220 A 7/1998 Matrascia et al.

FOREIGN PATENT DOCUMENTS
EP 0 647 911 A2 4/1995

*Primary Examiner*—William Oen
(74) *Attorney, Agent, or Firm*—Finnegan, Henderson, Farabow, Garrett & Dunner, L.L.P.

(57) ABSTRACT

A method for determining preselected performance characteristics of a tread of a tire consists in dividing the tread in a grid of cells forming piles of cells which are full, empty or partially full; identifying a group of piles of cells in each contact area; determining longitudinal stiffness values $c_{xj}$ and transversal stiffness values $c_{yj}$ for each pile; identifying families of discrete areas and transversal strips in each contact area; determining, for each strip, forces per unit of length by means of $c_{xj}$ and $c_{yj}$, longitudinal stiffness values per unit of length $c_{px}$ and transversal stiffness values per unit of length $c_{py}$ and by means of $c_{px}$ and $c_{py}$ and a preselected state of deformation; determining total forces associated with all contact areas by means of single forces associated with the discrete areas, and evaluating their pattern so as to establish whether the arrangement of full and empty cells optimizes the performance characteristics of the tread.

39 Claims, 9 Drawing Sheets

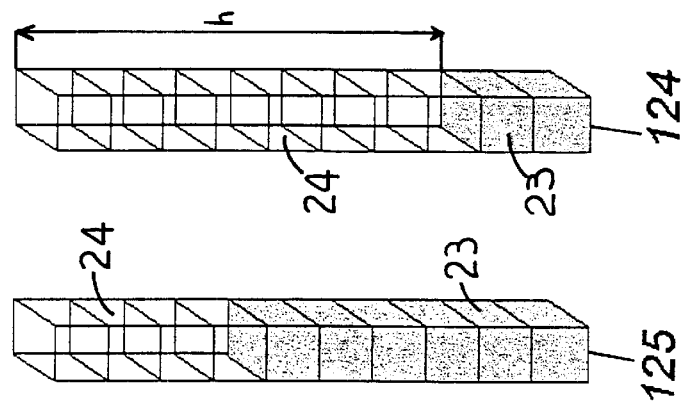
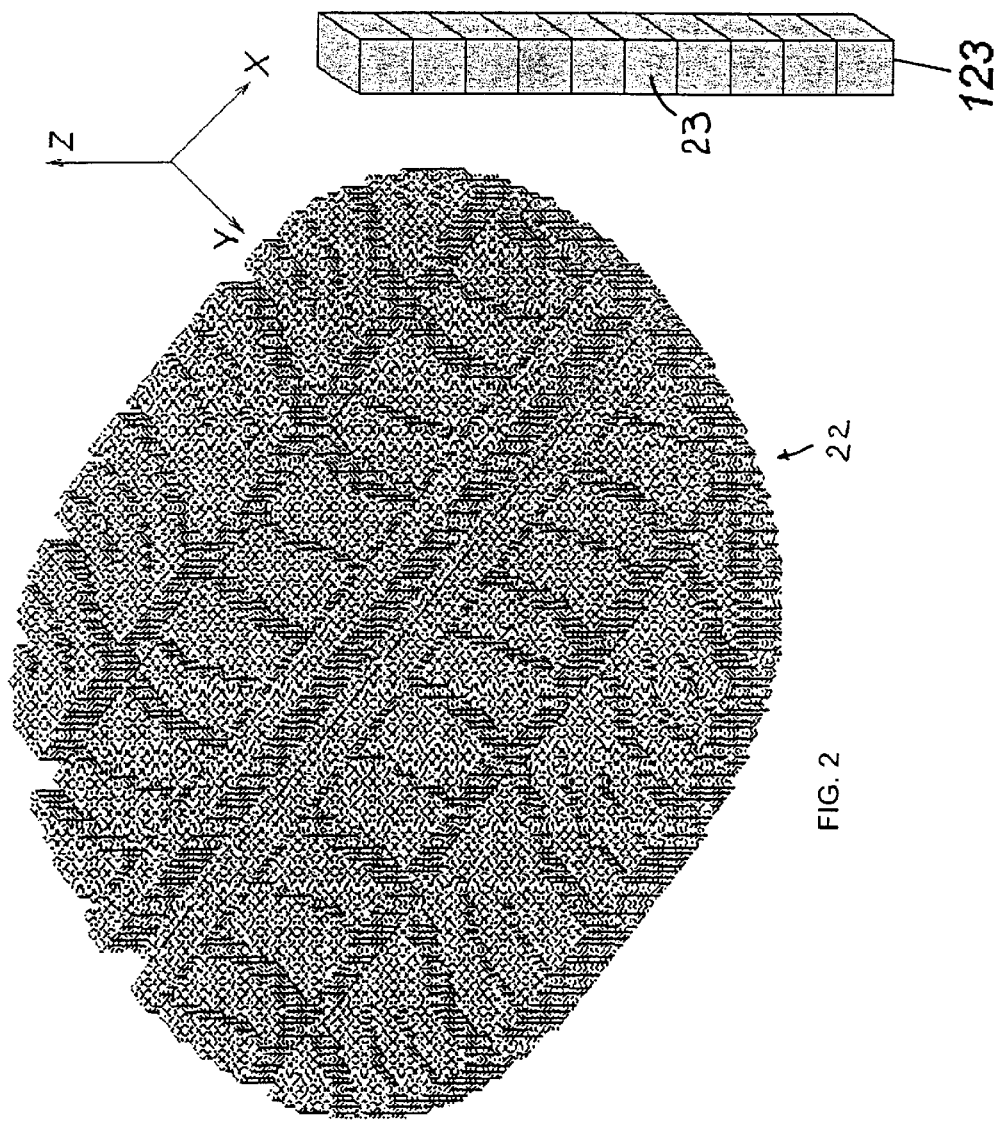
FIG. 10
FIG. 2

175/65 R 14 TREAD C
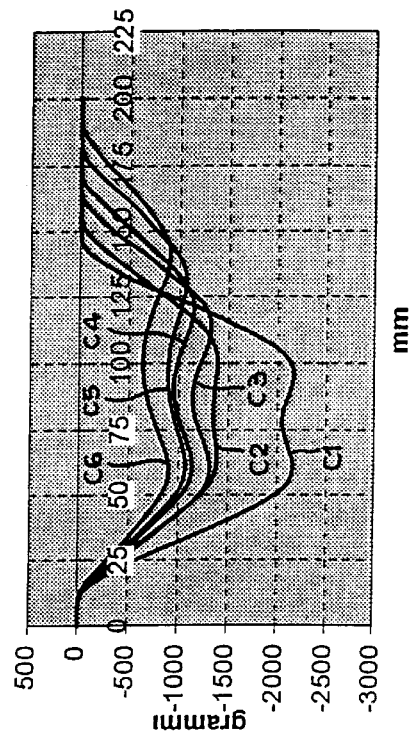
FIG. 5a PASSO A
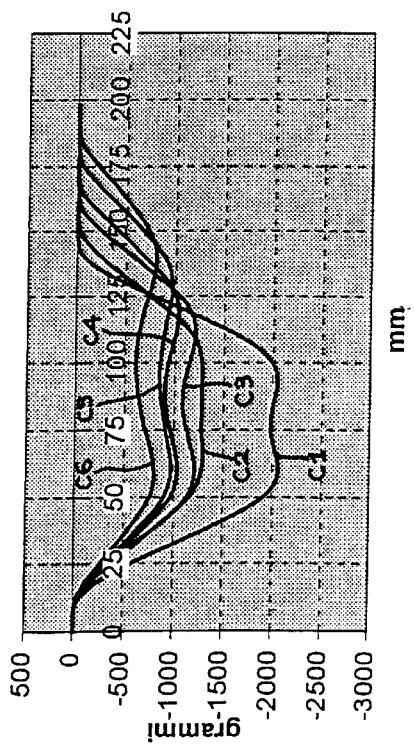
FIG. 5c PASSO C
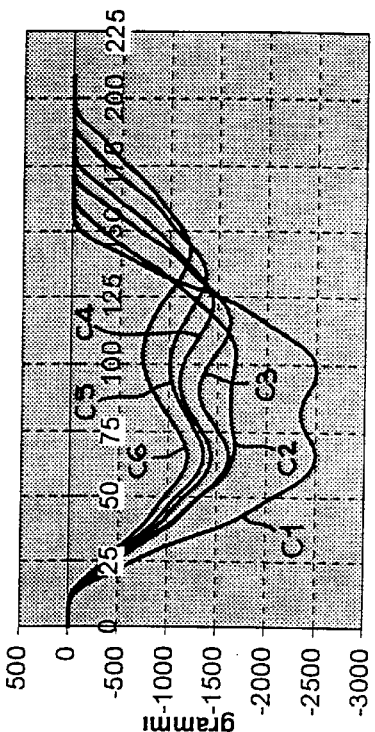
FIG. 5b PASSO B
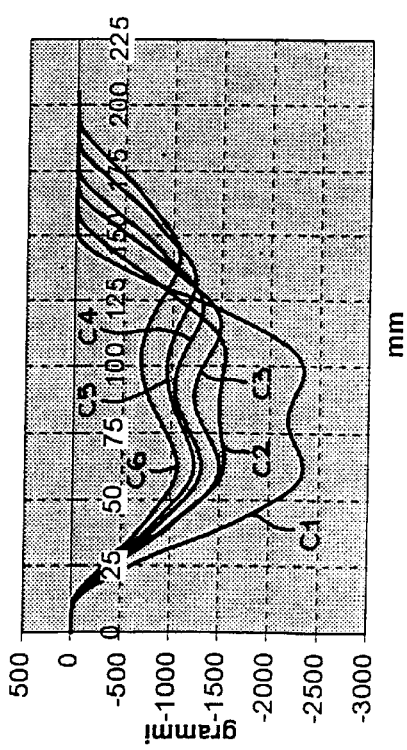
FIG. 5d PASSO D

175/65 R 14 TREAD A

PASSO A

PASSO B

PASSO C

PASSO D

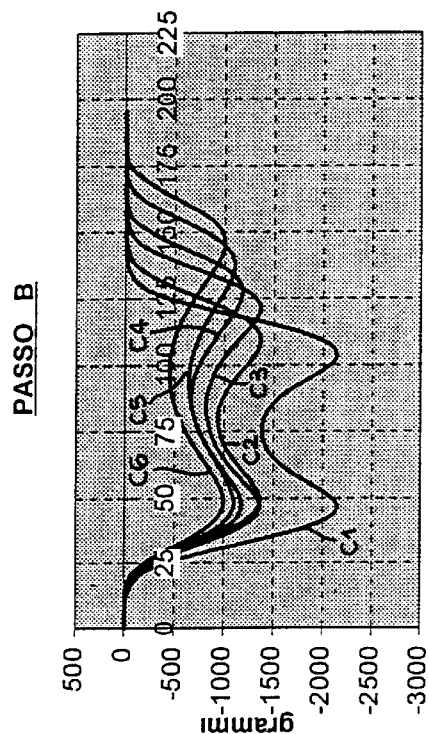
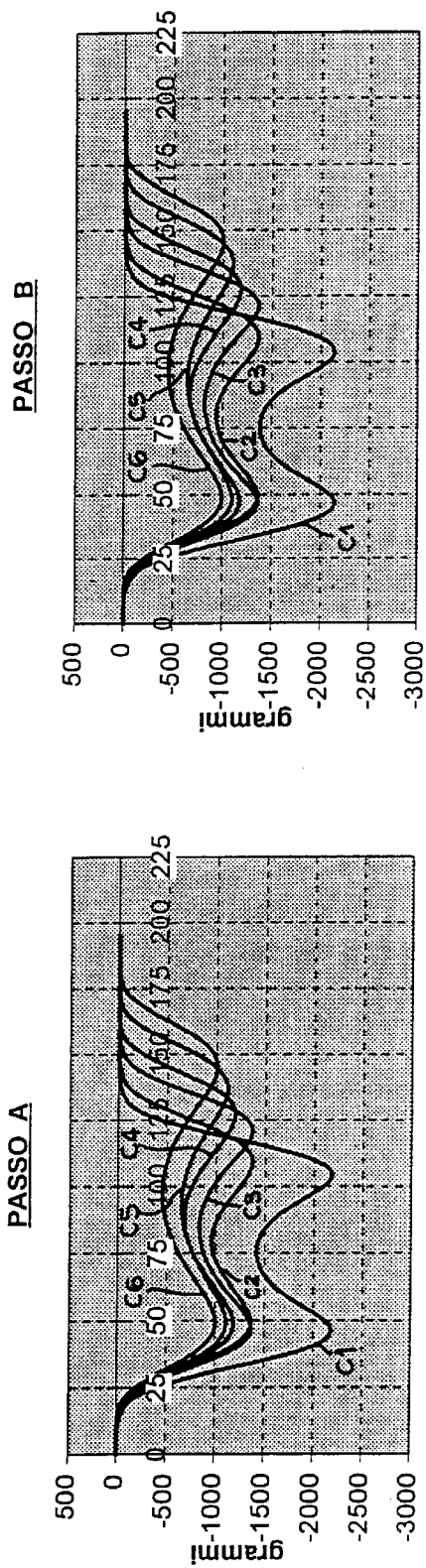
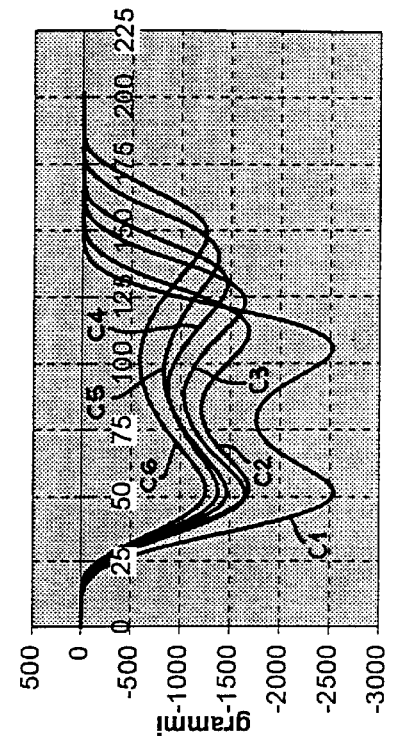
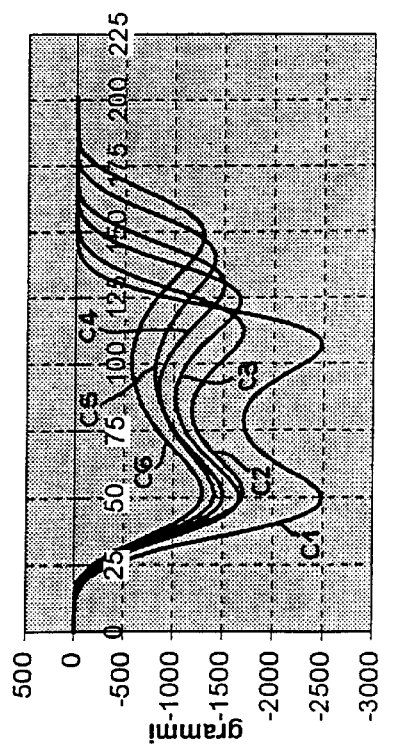
175/65 R 14 TREAD B
FIG. 9a PASSO A
FIG. 9b PASSO B
FIG. 9c PASSO C
FIG. 9d PASSO D

METHOD FOR DETERMINING PRESELECTED PERFORMANCE CHARACTERISTICS OF A TREAD OF A TIRE AND TIRE PROVIDED WITH A TREAD HAVING OPTIMAL CHARACTERISTICS WITH REFERENCE TO SAID PERFORMANCE CHARACTERISTICS

This application is based on European Patent Application No. 98204413.3 filed in Dec. 22, 1998 and U.S. Provisional Application No. 60/113,819 filed on Dec. 23, 1998, the content of which is incorporated hereinto by reference.

This invention relates to a method for determining preselected performance characteristics of the tread of a tyre, comprising ride comfort, noise and handling, and to a tyre provided with a tread having optimal characteristics with reference to said performance characteristics.

The subject of this inventions a method which allows to determine a set of performance characteristics of the tread of a tyre by means of a single criterion which refers to all the performance characteristics taken into account.

An initial aspect of the invention is a method for determining preselected performance characteristics of the tread of a tyre—comprising ride comfort, noise and handling—where a longitudinal direction (x), a transversal direction (y) and a vertical direction (z) are associated with said tread, where said tread has a preselected thickness and a preselected circumferential development and is made from a preselected rubber compound and comprises blocks and grooves having at least a preselected pitch, each portion of said tread in contact with a road surface having a contact area, said method comprising the following phases:

a) dividing said tread into a 3-D grid of full cells and empty cells of preselected dimensions (dxdydz);

b) identifying piles of said cells in said grid, each pile of cells having a base area equal to that of one cell (dxdy) and a height equal to said thickness of the tread, said piles of cells being full, empty or partially full;

c) identifying a group of said piles of cells present under a contact area;

d) determining a stiffness value in the longitudinal direction $c_{xj}$ and a stiffness value in the transversal direction $c_{yj}$ for each pile of cells in said contact area;

e) identifying families of discrete areas in said contact area, each discrete area of each family having preselected dimensions in said longitudinal direction (x) and in said transversal direction (y);

f) dividing said contact area in transversal strips with a preselected length in said longitudinal direction (x), each transversal strip comprising a set of said piles of cells;

g) determining a stiffness value per unit of length in the longitudinal direction $c_{px}$ and a stiffness value per unit of length in the transversal direction $c_{py}$ for each of said transversal strips (30), by summing said stiffness values in the longitudinal direction $c_{xj}$ and said stiffness values in the transversal direction $c_{yj}$ of said piles of cells of said set, respectively;

h) assigning a preselected deformation state to each of said transversal strips;

i) determining at least one force per unit of length associated with each transversal strip by means of a preselected function linking one of said stiffness values $c_{px}$ and $c_{py}$ and said deformation state j) summing preselected forces per unit of length of all the transversal strips associated with a discrete area to attain at least one preselected single force acting in one of said longitudinal (x) and transversal (y) directions;

k) determining at least one total force associated with said contact area by means of a suitable summation of preselected single forces associated with all the discrete areas of said contact area, said total force being representative of at least one of said performance characteristics;

l) repeating the steps from c) to k) for all the portions of said tread which are arranged in succession on said circumferential development and come in contact with said road surface in an entire revolution of said tyre by means of respective contact areas to attain a plurality of total forces associated with all the contact areas of said tread and m) evaluating the pattern of said plurality of total forces to establish whether the arrangement of said full cells and empty cells in said 3-D grid is substantially uniform along said circumferential development and generates total forces with substantially equal and constant values, so as to optimize at least one preselected performance characteristic of said tread.

Preferably said stiffness values $c_{xj}$ and $c_{yj}$ are given by the following relationships:

$$c_{xj} = \eta_x G A_p / h$$
$$c_{yj} = \eta_y G A_p / h$$

where G is a preselected value for the modulus of elasticity in shear of said compound, $A_p$ is the area of said pile of cells, h is said height of said pile of cells, $\eta_x$ is a coefficient of efficiency in said longitudinal direction (x) and $\eta_y$ is a coefficient of efficiency in said transversal direction (y), where said coefficients of efficiency $\eta_x$ and $\eta_y$ depend on the respective slenderness ratios $\lambda_{jx}$ and $\lambda_{jy}$—which, in turn, respectively depend on the ratio between the length of said pile of cells (dx) in said longitudinal direction and the height of said pile of cells and between the width of said pile of cells (dy) in said transversal direction and the height of said pile of cells—and on a shape coefficient which is a function of the position of said pile of cells in said grid.

Advantageously, each aforesaid discrete area has a length in said longitudinal direction (x) which is equal to said pitch of said tread.

Preferably, said length of each transversal strip is equal to a unit of length of said stiffness values $c_{px}$ and $c_{py}$.

According to a preferred embodiment, in the aforesaid phases from i) to l), total longitudinal forces are determined by means of said stiffness values per unit of length in the longitudinal direction $c_{px}$ of said strips and by means of a triangular longitudinal shearing deformation state of said tread, where said longitudinal deformation is null at the start of the contact area and maximum at the end of the contact area.

According to another preferred embodiment, in the aforesaid phases from i) to l), total transversal forces are determined by means of said stiffness values per unit of length in the transversal direction $c_{py}$ of said strips and by means of a triangular transversal shearing deformation state of said tread, where the transversal deformation is null at the start of the contact area and maximum at the end of the contact area.

Preferably, total longitudinal stiffness values $K_x$ associated with said contact areas of said tread are determined. Total transversal stiffness values $K_y$ associated with said contact areas of said tread are also determined.

According to an additional preferred embodiment, total torsional stiffness values $K_t$ associated with said contact areas of said tread are determined by means of the following phases:

n) identifying plane elements (dxdy) of said piles of cells under said contact area;

o) imposing a rotation on said contact area with respect to its centre of gravity;

p) determining the slip of each plane element (dxdy) in said contact area;

q) splitting said slip into a longitudinal component and a transversal component;

r) multiplying said longitudinal slip component by said longitudinal stiffness $c_{xj}$ and said transversal slip component by said transversal stiffness $c_{yj}$ to obtain elementary forces which, multiplied by the offset of said plane element (dxdy) with respect to said centre of gravity generate torque values and s) summing said torque values to obtain a total torsional moment which, linked with said rotation, results in said total torsional stiffness $K_t$ for each contact area.

Preferably, said stiffness values $K_x$, $K_y$ and $K_t$ have the following values:

$K_x$=2,300–2,500 N/mm $K_y$=2,400—2,600 N/mm $K_t$=80–88 N*m/degree

Preferably, the ratio between said stiffness values $K_y$ and $K_x$ has the following values:

$K_y/K_x$=0.98–1.05.

Advantageously, said piles of cells in said 3-D grid form a histogram in which a preselected character is associated with each pile of cells, said histogram being included in an optimal field delimited by a preselected lower surface and by a preselected upper surface.

Preferably, said histogram optimizes said total longitudinal stiffness values $K_x$, making said total longitudinal forces assume a mean value which is lower than a preselected limit to thus minimize the noise output by said tread and optimizing ride comfort.

Advantageously, said histogram also maximizes said total transversal stiffness values $K_y$, making said total transversal forces assume values which are higher than a preselected limit to thus optimize said tread with reference to handling.

Additionally, said histogram maximizes the total torsional stiffness values $K_t$ in said contact areas, making the total torsional moments of said contact areas assume values which are higher than a preselected limit to thus optimize said tread with reference to handling.

A second aspect of this invention relates to a tyre provided with a tread having optimal characteristics with reference to preselected performance characteristics, comprising ride comfort, noise and handling, where a longitudinal direction (x), a transversal direction (y) and a vertical direction (z) are associated with said tread, where said tread has a preselected thickness and a preselected circumferential development and is made from a preselected rubber compound and comprises blocks and grooves having at least a preselected pitch, each portion of said tread in contact with a road surface having a contact area, where said tread is divisible into a 3-D grid of full cells and empty cells of preselected dimensions, where in said grid piles of said cells are identified, each pile of cells having a base area equal to that of one cell (dxdy) and height equal to said thickness of the tread, said piles of cells being full, empty or partially full, a group of said piles of cells being identifiable under each contact area, each pile of cells having a stiffness value in the longitudinal direction $c_{xj}$ and a stiffness value in the transversal direction $c_{yj}$, where discrete areas with a preselected length in said longitudinal direction (x) and a preselected width in said transversal direction (y) are identifiable in said contact area, said contact area being divisible into transversal strips with a preselected length in said longitudinal direction (x), each transversal strip comprising a set of said piles of cells and having a stiffness value per unit of length in the longitudinal direction $c_{px}$ and a stiffness value per unit of length in the transversal direction $c_{py}$ determined by the summation, respectively, of said stiffness values in the longitudinal direction $c_{xj}$ and said stiffness values in the transversal direction $c_{yj}$ of said piles of cells in said set, at least one force per unit of length being associated with each transversal strip which depends on one of the said stiffness values per unit of length $c_{px}$ and $c_{py}$ and on a preselected state of deformation of said transversal strip, where at least one single force consisting of the sum of preselected forces per unit of length of all the transversal strips of said discrete area is associated with each discrete area, where a total force consisting of the sum of preselected single forces of all the discrete areas of said contact area are associated with each contact area, where said total force is representative of at least one of said performance characteristics, where said full and empty cells have a substantially uniform arrangement along said circumferential development of said tread and generate total forces associated with all the contact areas of all the portions of said tread in contact during one entire revolution, having values substantially equal and constant so as to optimize at least one preselected performance characteristic of said tread.

Preferably, said stiffness values $c_{xj}$ and $c_{yj}$ depend on preselected parameters of said tyre, according to the relationships given above.

Preferably, each discrete area and each transversal strip has a length equal to the aforementioned values.

Advantageously, a total longitudinal force and a total transversal force are associated with each contact area.

Preferably, a total longitudinal stiffness value $K_x$ and a total transversal stiffness value $K_y$—as well as a total torsional stiffness value $K_t$—are associated with each contact area.

Preferably, the aforesaid stiffness values $K_x$, $K_y$ and $K_t$ have the aforementioned values and the ratio between the aforesaid stiffness values $K_x$ and $K_y$ has the aforementioned values.

Advantageously, said piles of cells in said 3-D grid form a histogram with the aforementioned properties.

According to a preferred embodiment, said tread has a central longitudinal groove, a first, a second and a third lateral longitudinal groove (on the left and on the right), transversal grooves and portions of transversal grooves (on the left and on the right) connected by portions of longitudinal grooves. Said central longitudinal groove and each first lateral longitudinal groove delimit a rib. Each first and second lateral longitudinal groove and said transversal grooves delimit a central internal row of first blocks. Each second and third lateral longitudinal groove, said transversal grooves and said portions of transversal grooves delimit a central external row of second blocks. Each third longitudinal groove, said portions of longitudinal grooves, said transversal grooves and said portions of transversal grooves delimit a shoulder row of third and fourth blocks. Each of said first blocks has a transversal sipe and each of said second blocks has two transversal sipes.

Preferably, said tread has—with a modulus of elasticity in shear G equal to 1—the following stiffness values $K_x$, $K_y$ and $K_t$:

$K_x$=2345 N/mm $K_y$=2412 N/mm $K_t$=81 N*m/degree.

Advantageously, said tread has—for a modulus of elasticity in shearing G equal to 1—the following ratio between stiffness values $K_y$ and $K_x$:

$K_y/K_x=1.03$.

A third aspect of this invention relates to a tyre provided with a tread having optimal characteristics with reference preselected performance characteristics, comprising ride comfort, noise and handling, where a longitudinal direction (x), a transversal direction (y) and a vertical direction (z) are associated with said tread, where said tread has a preselected thickness and a preselected circumferential development and is made from a preselected rubber compound and comprises blocks and grooves having at least a preselected pitch, each portion of said tread in contact with a road surface having a contact area, where a total longitudinal stiffness value $K_x$, a total transversal stiffness value $K_y$ and a total torsional stiffness value $K_t$ are associated with each contact area, said stiffness values $K_x$, $K_y$ and $K_t$ having the following values:

$K_x$=2,300–2,500 N/mm $K_y$=2,400–2,600 N/mm $K_t$=80–88 N*m/degree.

Preferably, the ratio between said stiffness values $K_y$ and $K_x$ has the following values:

$K_y/K_x$=0.98–1.05.

In particular, said tread has—for a modulus of elasticity in shear G equal to 1—the following stiffness values $K_x$, $K_y$ and $K_t$:

$K_x$=2345 N/mm $K_y$=2412 N/mm $K_t$=81 N*m/degree.

Furthermore, said tread has—for a modulus of elasticity in shear G equal to 1—the following ratio between stiffness values $K_y$ and $K_x$:

$K_y/K_x$=1.03.

The method and the tyre according to this invention are based on a "full and empty" evaluation criterion (full cells and empty cells) in discrete areas of the tread in the contact area. The empty and full elements allow to identify several typologies of discrete areas in the tread pattern (as families of blocks or parts of blocks) and for each typology or family of discrete areas the stiffness can be estimated by means of preselected equations, known to construction engineers. The contact area consists of a suitable set of discrete areas and the stiffness of each discrete area contributes to the total stiffness of the portion of tread in the contact area in the longitudinal direction $K_x$, transversal (lateral) direction $K_y$ and torsional sense $K_t$. This is because the contact area is divided into transversal strips of a preselected length in the longitudinal direction (x). Each strip comprises a set of piles of cells with a stiffness value in the longitudinal direction $c_{xj}$ and a stiffness value in the transversal direction $c_{yj}$. The stiffness per unit of length in the longitudinal direction $c_{px}$ and the stiffness per unit of length in the transversal direction $c_{py}$ of each strip result respectively from summing the values of $c_{xj}$ and the values of $c_{yj}$ of the piles of cells of the set. The sum of the stiffness values per unit of length $c_{px}$ and the sum of the stiffness values per unit of length $c_{py}$ relative to the transversal strips form the longitudinal stiffness $K_x$ and the transversal stiffness $K_y$ of the tread, respectively. The $c_{px}$ values are summed to obtain $K_x$ and the $c_{py}$ values are summed to obtain $K_y$.

Consequently, given the longitudinal stiffness per unit of length $c_{px}$ of each discrete area, the corresponding longitudinal force per unit of length can be computed by assigning a specific deformation state and, consequently, so can the force relating to a discrete area. When the length of each discrete area is equal to a single pitch, the force is called "basic curve".

The total longitudinal force (shearing or slipping force) under the contact area is determined as the sum of the longitudinal forces per unit of length of the contact area, by subjecting the contact area to a triangular shearing deformation state—i.e. a deformation which is null at the start of the contact area and maximum at the end—and by using a brush model (known to a person skilled in the art) separated in the longitudinal direction.

The total longitudinal force value is relating to a position of the contact area with respect to the entire development of the tread. The calculation of the total longitudinal force is repeated for several positions of the contact area so as to attain the force pattern for an entire tyre revolution and estimate its mean value and its variation (oscillation) around this value.

The ride comfort and the noise output by the tread—in particular the output "signal volume"—are optimized by controlling the longitudinal force.

The expression "signal volume" is herein used to indicate the intensity of the noise output by the tread, i.e. the absolute noise volume.

The ride comfort is optimized by minimizing the longitudinal force generated by the tread during tyre rolling on any type of road surface (consequently, including irregular road surfaces and/or isolated obstacles, i.e. manhole covers, tram tracks, etc.). In particular, the harmonic components of the longitudinal force—involving frequencies between 0 and 150 Hz—are considered.

In turn, the noise output by the tread when rolling is minimized by means of an optimal pattern of longitudinal stiffness per unit of length of the tread in its circumferential development, i.e. by means of a longitudinal force with a low mean value and limited oscillations around this value. This allows to reduce the "volume" of the output noise (with equal modulus of elasticity G of the tread compound). In this case, the harmonic components of the longitudinal force involve frequencies exceeding 150 Hz.

The noise output by the tyre when cornering, i.e. in conditions involving leaning and vertical load transfer, is minimized by taking into account the variations in length of the contact area with the vertical load. In other words, both the variations of the contact area along the circumferential development and the variations in the contact area due to rapid variations of the vertical load are taken into account.

The method according to this invention also allows to determine the slip angle (force) of the tread of a tyre when cornering by means of the stiffness per unit of length $c_{py}$ in the transversal direction. Also in this case, a brush model is used and a triangular transversal (shearing) deformation is imposed on the contact area, i.e. a deformation which is null at the start of the contact area and maximum at the end of the contact area. The transversal stiffness of the tread $K_y$ results—as mentioned above—from the sum of the stiffness values per unit of length $c_{py}$ relative to the transversal strips which the contact area is divided into.

Handling is optimized—as far as the contribution of the tread to the slip angle is concerned—by means of a high transversal stiffness of the tread involved in the contact. This is obtained by controlling the stiffness per unit of length in the transversal direction of the tread.

The method according to this invention also allows to determine the torsional stiffness of the tread using the stiffness values of the piles of cells in the longitudinal direction $c_{xj}$ and in the transversal direction $c_{yj}$. The total torque $C_{kt}$ generated by a revolution imposed on the contact area is determined: the ratio between the torque and the revolution is the total torsional stiffness $K_t$ of the tread under contact.

A high torsional stiffness of the tread allows to additionally optimize handling. This is attained by controlling the stiffness values per unit of length in the longitudinal and lateral direction and the geometrical position of these stiffness values (i.e. of the cell of the tread to which these stiffness values refer) in the contact area.

Consequently, the typology of full and empty elements allows to control the variation of longitudinal, transversal and torsional stiffness during tyre rolling. These variations of stiffness influence the performance of the tyre with respect to a vehicle (vibrations, handling) and the external environment (vibrations, noise).

Characteristics and advantages of this invention will now be further illustrated with reference to an embodiment represented as non-limiting example in the enclosed drawings, wherein:

FIG. 2 is a perspective view (enlarged scale) of a portion of the tread illustrated in FIG. 1 with a given contact area;

FIGS. 5a, 5b, 5c and 5d illustrate the amplitude of "basic curves" in four types of discrete areas, corresponding to four pitches, of a contact area of the tread illustrated in FIG. 1;

FIGS. 9a, 9b, 9c and 9d illustrate the amplitude of "basic curves" in four types of discrete areas, corresponding to four pitches, of a contact area of the tread illustrated in FIG. 8;

FIG. 10 illustrates (enlarged scale) piles of cells in the portion of tread illustrated in FIG. 2.

Figure 1:
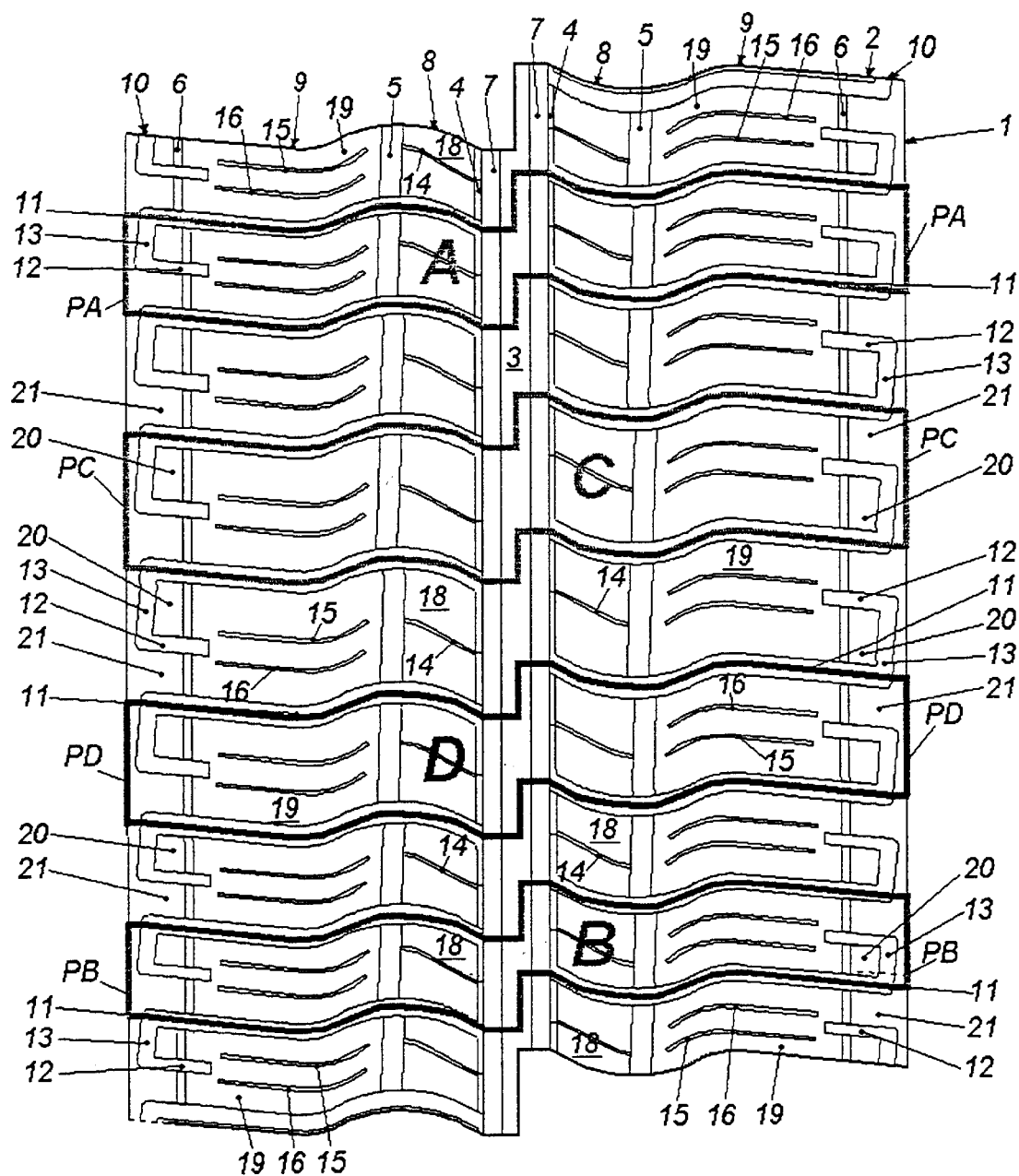
FIG. 1 is a partial view (plan view) of a tread of a tyre, according to this invention.

FIGS. 1–4 illustrate a tread 1 of a vehicle tyre 2 with an optimized pattern for ride comfort, noise and handling according to this invention. The tyre carcass has a standard structure (not shown). The tyre size is 175/65 R 14 and tread marking is TREAD C.

Tread 1 has a central longitudinal groove 3 (which extends in the direction of movement of the tyre, or circumferential sense, direction x in FIG. 2) and lateral longitudinal grooves 4, 5 and 6, on the left and on the right, i.e. located to the left and to the right of groove 3. Tread 1 also has transversal grooves 11 (which extend substantially in direction y in FIG. 2) and portions of transversal grooves 12, on the left and on the right, connected by portions of longitudinal grooves 13. Groove 3 and each groove 4 delimit a circumferential rib 7. Each pair of longitudinal grooves 4 and 5, left and right, and the transversal grooves 11 delimit an internal central row 8 of blocks 18. Each pair of longitudinal grooves 5 and 6 (to the left and to the right), the transversal grooves 11 and the portions of transversal grooves 12 delimit an external central row 9 (between centre and shoulder) of blocks 19. Each groove 6 (on the left and on the right), the portions of longitudinal grooves 13, the transversal grooves 11 and the portions of transversal grooves 12 delimit a shoulder row 10 of blocks 20 and 21 (FIGS. 1–4). Each block 18 has a transversal sipe 14 and each block 19 has two transversal sipes 15 and 16. Blocks 18, 19, 20 and 21 in rows 8, 9 and 10 on the left (associated with the left-hand shoulder) and on the right (associated with the right-hand shoulder) are staggered with respect to an axis of the longitudinal centreline of tread 1. In practice, each block in a right-hand row is obtained by turning the corresponding left-hand block by 180° around an axis on the plane of the sheet passing through the centreline of groove 3. The resulting block is then reversed by 180° with respect to an axis on the plane of the sheet perpendicular to the axis of the centreline of groove 3.

Four families of discrete areas, indicated with A, B, C and D (FIG. 1), are present in tread 1, corresponding—respectively—to pitch $p_A$, $p_B$, $p_C$ $p_D$ (each pitch represents the length, in the circumferential sense, of a block and two adjacent transversal half grooves, in particular one block 18 and two half grooves 11). Each discrete area corresponds to a pitch and includes a portion of tread on the left-hand side and a corresponding portion on the right-hand side. The pattern of tread 1 has four different pitch values ($p_A$, $p_B$, $p_C$ $p_D$) distributed along the development of the tread according to a preselected sequence of pitches. The pitch sequence is realized according to the invention described in U.S. Pat. No. 5,371,685 with the purpose of modulating the noise output by the tyre and, in particular, to avoid a siren effect (the presence of a single frequency).

The entire tread in all its circumferential development is obtained by fitting the single discrete areas A, B, C and D together. A portion of tread 1 in contact with a road surface has a contact area 22 (FIG. 2) corresponding to a preselected vertical load and a fixed inflation pressure. Different contact areas are achieved by means of different vertical loads and different inflation pressures.

According to the method of this invention, the tread in its entire development is divided into a grid of full and empty 3-D cells 23 and 24 of preselected dimensions (dxdydz) (FIGS. 2 and 10). The cells are grouped in vertical piles (direction z in FIG. 2), i.e. piles of full, empty and partially full cells, 123, 124 and 125 respectively, with a base of two full cells which form the background of the tread. The cells have, for example, unitary dimensions of 1 mm per side. The height of the piles of cells is equal to the thickness of the tread and is considered constant, e.g. 10 mm. The piles of cells—full, empty and partially full—form a histogram in which each pile of cells in the grid corresponds to a character, i.e. one byte, indicating whether the pile of cells is full (123), empty (124) or partially full (125). The histogram represents a mapping of the full and empty elements of the tread pattern along its entire circumferential development.

A group of piles of cells is located under the contact area 22. The stiffness in the longitudinal direction $c_{xj}$ and the stiffness in the transversal direction $c_{yj}$ for each pile of cells in the group results from the following equations:

$$c_{xj} = \eta_x G A_p / h \tag{1}$$

$$c_{yj} = \eta_y G A_p / h \tag{2}$$

where G is the modulus of elasticity in shear, $A_p$ is the area of a pile of cells (area of a plane element dxdy of the pile of cells or area of a cell dxdydz on plane xy), h is the height of the pile of cells (equal to the tread thickness), $\eta_x$ is a coefficient of efficiency in the longitudinal direction x and $\eta_y$ is a coefficient of efficiency in the transversal direction y.

The coefficient of efficiency $\eta_x$ depends on the ratio of slenderness $\lambda_{jx}$, which is the ratio between the length of the pile of cells dx and the height of the pile of cells h (thickness of the tread) and on a shape coefficient, which depends on the position of the pile of cells in the tread grid: angle position, edge position, inside a group of piles, full pile, empty pile, partially full pile, etc.

The efficiency coefficient $\eta_y$ depends on the ratio of slenderness $\lambda_{jy}$, which is the ratio between the width of the pile of cells dy and the height on the pile of cells and on a shape coefficient, which depends on the position of the pile of cells in the tread grid, as mentioned for $\eta_x$.

The values of $\eta_x$ and $\eta_y$ are between 0 and 1.

Here follow some examples of values assumed by an efficiency coefficient $\eta$ for different values for the ratio of slenderness $\lambda_j$, in the case where one pile of full cells is surrounded by empty piles, consequently without a shape effect (reference pile), taking into account that $\lambda_j$ depends on the lengths dx and dy chosen:

| | | |
|---|---|---|
| $\eta = 0.4$ | for | $\lambda_j = 0.5$ |
| $\eta = 0.6$ | for | $\lambda_j = 0.8$ |
| $\eta = 0.7$ | for | $\lambda_j = 1$ |
| $\eta = 0.8$ | for | $\lambda_j = 1.5$ |
| $\eta = 0.9$ | for | $\lambda_j = 2.5$ |
| $\eta = 0.98$ | for | $\lambda_j = 5$ |
| $\eta = 1$ | for | $\lambda_j = 8$ |

In equations (1) and (2), the modulus of elasticity G is initially set to be equal to unity and then assumes a value corresponding to the compound used for the tread. The stiffness values of each pile of cells are determined and compared with by means of weighted coefficients (coefficients of efficiency) with the reference pile. The weighted coefficients allow to take into consideration whether the pile of cells of the tread is full, empty or partially full and the effects of the edge (e.g. angle position, edge position or inside a group of piles of cells, etc.) and are determined empirically by coding the calculation results with the method of Finite Elements (FE). The stiffness values of the pile of reference cells are modified by means of the weighted coefficients using the Finite Element calculation method.

The stiffness per unit of length in the longitudinal direction $c_{px}$ and the stiffness per unit of length in the transversal direction $c_{py}$ result from the values of $c_{xj}$ and $c_{yj}$, as will be described below.

Consequently, the tread pattern is characterized by determining the histogram of its entire development and then identifying the stiffness in the longitudinal and transversal direction of the piles of cells by means of weighted coefficients.

The procedure herein described has general validity, i.e. given the type of full and empty elements in the 3-D grid of any tread pattern it is possible to determine the longitudinal and the transversal stiffness of each pile of cells by means of weighed coefficients. In order to take the modulus of elasticity in shear G of the tread compound into account, the value G=1 is used initially and then replaced with the actual value of the modulus of elasticity in shear of the compound.

The full and empty elements allow to identify various families or types of families of discrete areas which form—as a set—the contact area of the tread (four families of discrete areas A, B, C and D were identified in tread 1). The number of families of discrete areas depends on the complexity of the tread pattern. Each discrete area includes a particular type of blocks and all the equal blocks in the pitch sequence form a type or family of full and empty elements.

Once the families of discrete areas are identified, the corresponding stiffness for each type of discrete area is identified, in particular the longitudinal stiffness and the transversal stiffness and the corresponding forces.

In fact, making a single pitch enter and exit the contact area and subjecting it to a suitable deformation, it is possible to determine the relative force in this discrete area by means of the following equation:

$$F = K^* x \text{(force=stiffness*slip imposed)} \quad (4)$$

which is the "basic curve" corresponding to a pitch of the tread pattern.

Figure 4:
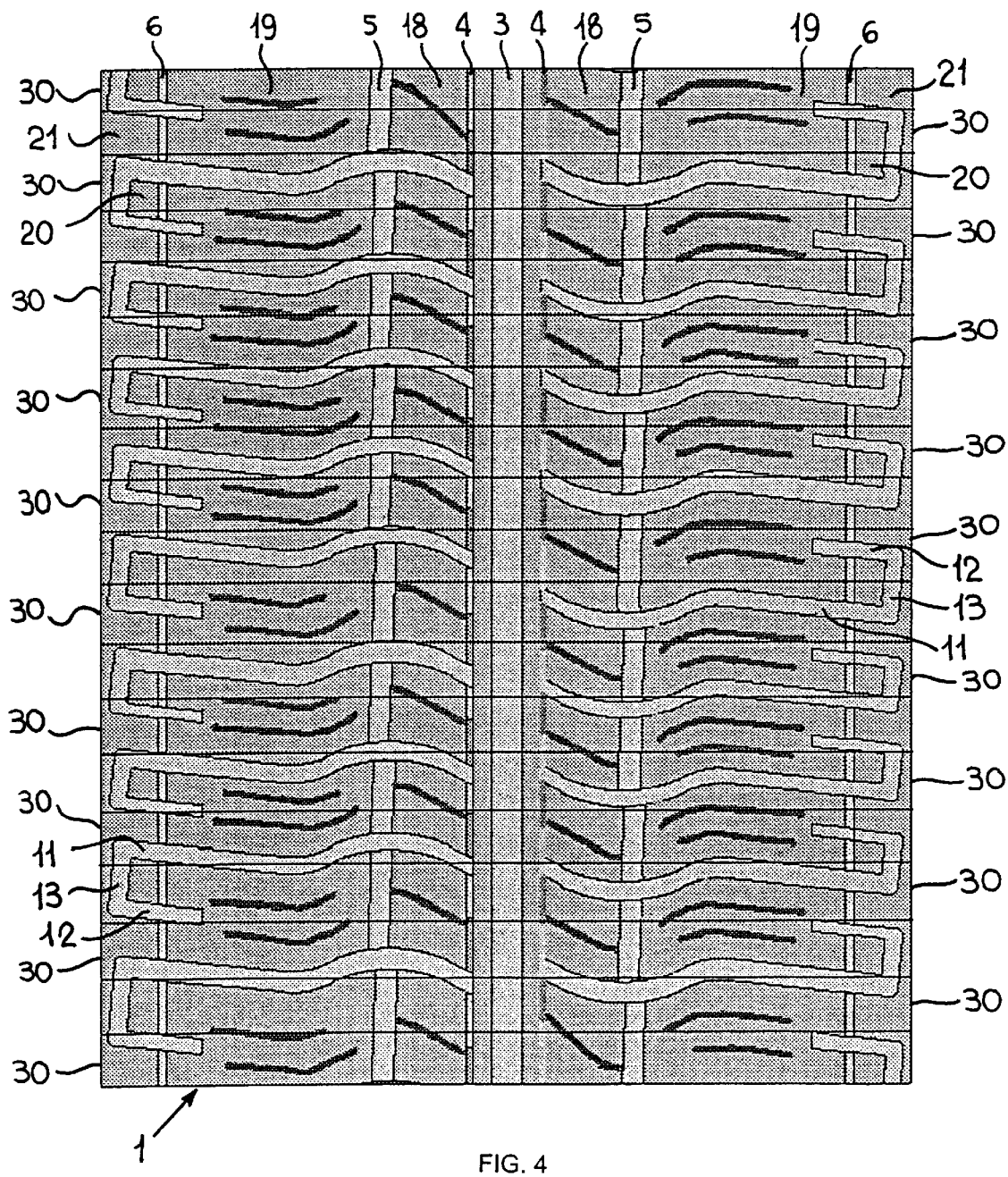
FIG. 4 illustrates (reduced scale) the tread of FIG. 1 divided into transversal strips.

In tread 1, the contact area 22 is divided into transversal strips 30 which run from shoulder to shoulder of the tyre (FIG. 4). Each strip 30 has a length in the direction x equal to the unit of length of stiffness $c_{px}$ (N/m). Each strip 30 comprises a set of piles of cells having stiffness values $c_{xj}$ and $c_{yj}$. The stiffness per unit of length in the longitudinal direction $c_{px}$ and the stiffness per unit of length in the transversal direction $c_{py}$ of each strip 30 are obtained respectively by summing the values of $c_{xj}$ and the values of $c_{yj}$ of the piles of cells in the set. Each strip 30 is subjected to a state of triangular deformation, simulating sliding in the contact area. A set of longitudinal (or transversal) forces per unit of length is obtained by multiplying the stiffness per unit of length $c_{px}$ (or $c_{py}$) of each strip 30 of tread by the deformation state relating to the strip. From these values, the single longitudinal (or transversal) forces associated with each discrete area result. The total longitudinal (or transversal) force in the instant t in the contact area is obtained by summing the single longitudinal (or transversal) forces.

As in tread 1 the discrete areas have a length equal to a pitch, the curves. representing the variations in the forces generated by these macro-areas, or pitches, through the contact area, are called "basic curves".

The total force relating to a given position in the contact area of the tread development is obtained by suitably summing the "basic curves" relating to the discrete areas contained in the contact area. Suitably summing the "basic curves" relating to the pitches of the tread pattern entails taking account of the pitch sequence of the tread area (several pitches or macro-areas and parts of macro-areas can occur at the same time) and automatically taking account of the displacement which exists between the sequences of the two shoulders, the displacement of the blocks in two adjacent rows and the different dimensions of the contact area when varying the vertical load and inflation pressure. Consequently, the "basic curves" of the pitches or part of the pitches present in the contact area are summed.

The ensemble of total longitudinal (or transversal) forces obtained for an entire revolution of the tyre (different positions of the contact area in the sequence of the tread) provides the pattern in time (or space, according to the speed of advancement) of the longitudinal (or transversal) force generated by the tread and applied to a hub of a wheel of the vehicle.

As mentioned above, the longitudinal stiffness $c_{px}$ per unit of length of the tread is used to determine the longitudinal force applied by the tread to the hub. This stiffness is not constant along the entire development of the tread but depends on the tread pattern. The stiffness $c_{px}$ tends to be minimum in a recess between blocks and maximum in a full block without sipes.

By operating on the "basic curves", i.e. modifying and consequently optimizing the arrangement of full and empty elements in the macro-areas or pitches, the value of the longitudinal force and its variations around the mean value is minimized (optimized).

The optimization criterion requires that the amplitudes (peak values) of the "basic curves" fall within a well defined field of force values and the phase displacement of the "basic curves", i.e. the phase with which these curves are summed, falls within a well defined field of angle values.

In practice, an optimal histogram field, delimited by two surfaces (lower and upper) is determined, which optimizes the longitudinal stiffness values so that the variation of longitudinal force in a tyre revolution is contained in a predefined field around a low mean value. This entails a low longitudinal force value being transmitted by the tread to the carcass of the tyre and, consequently, to the wheel hub.

The ride comfort and noise, performances are optimized by controlling the longitudinal absolute force value and its variations around the mean value during tyre rolling when varying the portion of the tread pattern involved in the contact.

The method, consequently, allows to optimize the forces generated by tyre rolling. These forces are determined by a state of deformation which reproduces the excitation of the road. The road irregularities generate longitudinal forces and variations in the angular speed of the tyre, which lead to longitudinal slipping, i.e. shearing deformations of the tread in the contact area. Consequently, road irregularities convey slipping energy to the contact area of a tyre. In this case, the contribution of the irregularities of the road is added to the triangular longitudinal deformation which occurs in braking or accelerating, with frequencies which depend on the wavelengths of these irregularities and the travelling speed. For example, if the speed of advancement is 80 km/h and the objective is to analyse vibrations between 0 and 500 Hz, the wavelengths of the road irregularities involved will be equal to or higher than 44 mm. If the speed is 100 km/h, the wavelengths involved will be equal to or higher than 55 mm.

In practice, the longitudinal force for an entire tyre revolution is determined by means of a brush model—known to engineers expert in the field—and by a discrete transformation of the sum of the longitudinal contact forces to take account of the variations of stiffness per unit of length $c_{px}$ of the tread.

The results obtained with the method according to this invention can be compared with the experimental results providing a transfer function between longitudinal force and slipping speed by analysing the harmonics relating to the tread pattern. These experimental results can be attained by means of a braking and acceleration test machine as that described in U.S. Pat. No. 5,777,220.

In order to optimize the tyre performance for handling, the "basic curves" are determined (forces associated with the discrete areas) in the transversal direction, as mentioned above, by using the stiffness values per unit of length $c_{py}$ in the transversal direction and imposing a triangular transversal deformation in the contact area (without slipping).

High values of transversal stiffness of the tread and the slip angle of the tread of the tyre when cornering can be attained by means of an optimal arrangement of full and empty elements of the tread patter. This is achieved by determining an optimal histogram field delimited by two surfaces (lower and upper) which optimizes the transversal stiffness values, maximizing the value so as to have a high lateral thrust for cornering. Consequently, the arrangement of transversal stiffness of the tread can be controlled and the slip angle can be optimized by means of the optimization criterion of full and empty elements.

The arrangement of transversal stiffness of the tread is additionally controlled by setting the ratio between the total stiffness in the transversal direction $K_y$ and the total stiffness in the longitudinal direction $K_x$ of the portion of tread in the contact area between 0.98 and 1.05.

This allows to optimize the performance of the tread for comfort/noise and handling at the same time.

Experimentally, it is possible to determine the total lateral stiffness $K_y$ by means of a slip test from which the slip stiffness of the tyre $K_d$ results. The slip stiffness can be split into a structural stiffness of the tyre $K_s$ and the stiffness of the tread $K_y$ (the slip stiffness is formed by the two stiffness values in series and is determined by means of the relationship $1/K_d = 1/K_s + 1/K_y$)

The total torsional stiffness $K_t$ of the tread under contact is determined by the combination of the longitudinal stiffness values $c_{xj}$ and the transversal stiffness values $c_{yj}$. This is because we consider that the contact area is formed by plane elements (dxdy) of the group of piles of cells present herein and a rotation is applied around the geometrical centre of gravity of the contact area. The slip of any point in the area is the product of the rotation imposed (radian angle) multiplied by the distance of the area from the centre of gravity. The slip of a generic plane element dxdy can be split into the longitudinal x and transversal y components. Forces which, multiplied by their respective offsets, result in torques with respect to the centre of gravity of the contact area are obtained by multiplying these components of slip by the respective stiffness values $c_{xj}$ and $c_{yj}$. The sum of these torque values, extended to the entire contact area, is equal to the total torque $C_{kt}$ generated by the rotation of the contact area. The ratio between total torque and rotation of the contact area allows to determine the total torsional stiffness $K_t$ of the tread under contact. This stiffness is made as high as possible by means of the stiffness values $c_{xj}$ and $c_{yj}$ and the position of the plane element dxdy which the stiffness values are associated with.

In practice, a preferred tread according to this invention is that where the arrangement of full and empty cells is substantially uniform and equal in all the contact areas located along the circumferential development of the tyre. In this way, the stiffness values in the longitudinal direction and in the transversal direction in all the contact areas are substantially equal and, during rolling of said tyre, the longitudinal and transversal force values applied to the hub are constant, thus optimizing comfort, noise and handling.

With the method according to this invention, the "basic curves" for TREAD C were determined. FIGS. 5a, 5b, 5c and 5d illustrate the graphs for the vertical "basic curves" of the four pitches (A, B, C and D) of TREAD C. The longitudinal "basic curves" (non illustrated) are the primary derivatives, with respect to the circumferential development, of the vertical "basic curves". In the graphs, the amplitudes of the "basic curves" are expressed in grams and conventionally have a negative sign, as they represent a negative force variation with respect to an applied vertical load. The amplitudes are shown as a function of the circumferential diameter of the tyre, expressed in mm. For the purpose of example, the "basic curves" c1, c2, c3, c4, c5 and c6, attained by means of six deflections of the tyre, i.e. by means of six vertical loads, for an inflation pressure value of 2.2 bar (rated pressure or running pressure of the vehicle) are provided for each discrete area. The deflection values are the following:

15 mm corresponding to a vertical load of approximately 300 kg (c1);

17 mm corresponding to a vertical load of approximately 340 kg (c2);

19 mm corresponding to a vertical load of approximately 380 kg (c3)

21 mm corresponding to a vertical load of approximately 420 kg (c4);

23 mm corresponding to a vertical load of approximately 460 kg (c5) and 25 mm corresponding to a vertical load of approximately 500 kg (c6).

The vertical load was determined by multiplying the deflection by a mean vertical stiffness of 20 kg/mm of a standard tyre, illustrated below and denoted TREAD A.

Figure 3:
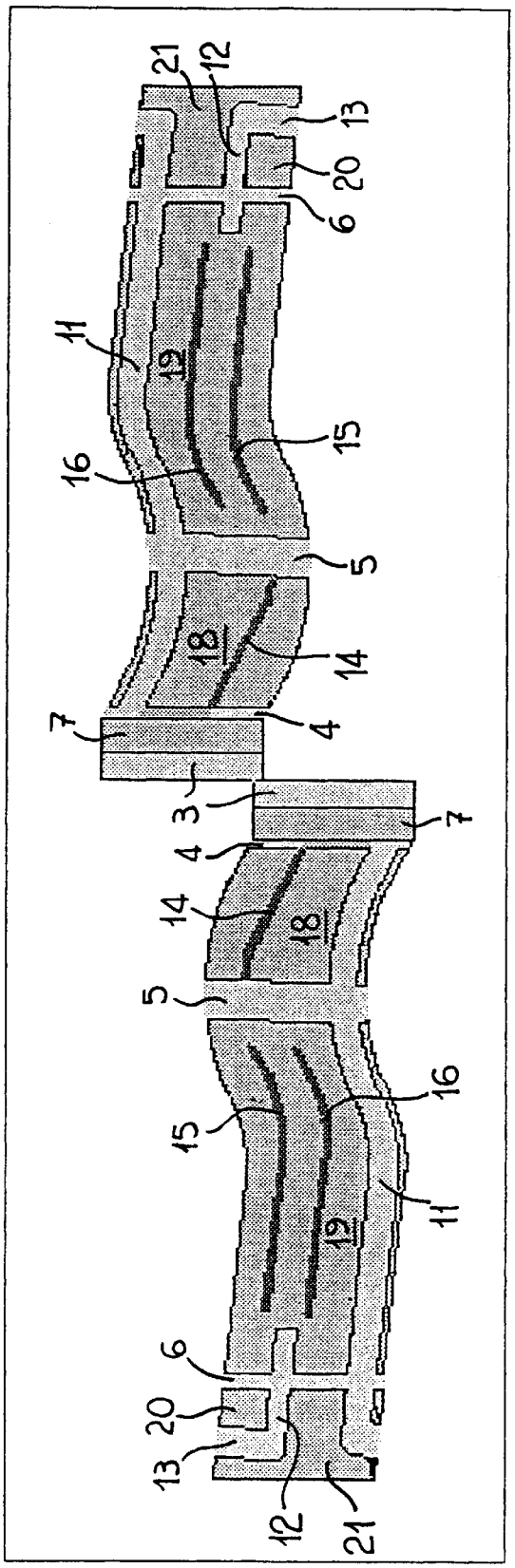
FIG. 3 illustrates (enlarged scale) a discrete area corresponding to a pitch of the tread illustrated in FIG. 1.

The results arising from the graphs in FIGS. 5a, 5b, 5c and 5d physically reflect the performance of a tyre with a slick tread (without pattern) where a single pitch is carved, as shown in FIG. 3, which is made to roll on a road and deflected with vertical loads so as to attain the aforementioned vertical deflection values. Measuring the vertical or longitudinal force (which is the derivative of the vertical force) at the hub of the tyre, it is noticed that when the pitch arrives near the contact area the force starts to vary and returns constant (or null if the variation of force with respect to the vertical load is taken as a reference) when the pitch has entirely left the contact area. The variation of this force depends on the travel of the tyre (space crossed during rolling). The space where the variation of force is contained is called length of influence of the pitch and is greater than the geometrical length of the contact area of the tyre at a given vertical deflection.

The length of influence of a pitch in a preselected contact area, for each single vertical deflection, and the maximum peak value of the corresponding "basic curve" are taken in order to characterize a "basic curve". Consequently, the subtended area of a "basic curve" is represented by a rectangle with a width equal to the length of influence and a height equal to the maximum force value.

These quantities are normalized for each vertical deflection and for each type of pitch or discrete area which composes the tread pattern sequence. The length of influence is related to the circumferential development of the tyre and the maximum value of the "basic curve" is related to the vertical load.

Table 1 attached illustrates the value of the ratio (PN) between the equivalent length "Ps" of each pitch or discrete area (A, B, C, D) and the development of the tyre "s" for each deflection for TREAD C.

Table 2 attached illustrates the value of the ratio (FN) between the maximum "basic curve" value "Ftass" of each pitch or discrete area (A, B, C, D) and the vertical load value "Car V" corresponding to each vertical deflection, for each deflection, also for TREAD C.

The parameters PN and FN are normalized and consequently not dimensional. The product of the two parameters is an energy index, connected to the rolling of the pitch under the contact area.

TABLE 1

PN = Ps/s 175/65 R 14 TREAD C

|  | Pitch A | Pitch B | Pitch C | Pitch D |
| --- | --- | --- | --- | --- |
| Deflaction 15 mm | 0.0797 | 0.0819 | 0.0840 | 0.0862 |
| Deflaction 17 mm | 0.0840 | 0.0862 | 0.0883 | 0.0905 |
| Deflaction 19 mm | 0.0905 | 0.0905 | 0.0926 | 0.0948 |
| Deflaction 21 mm | 0.0926 | 0.0948 | 0.0969 | 0.0991 |
| Deflaction 23 mm | 0.0969 | 0.0991 | 0.1012 | 0.1034 |
| Deflaction 25 mm | 0.1012 | 0.1034 | 0.1055 | 0.1077 |

TABLE 2

FN = Ftass/Car V 175/65 R 14 TREAD C

|  | Pitch A | Pitch B | Pitch C | Pitch D |
| --- | --- | --- | --- | --- |
| Deflaction 15 mm | 0.006839 | 0.007192 | 0.007772 | 0.008331 |
| Deflaction 17 mm | 0.003797 | 0.004073 | 0.004543 | 0.004949 |
| Deflaction 19 mm | 0.003182 | 0.003469 | 0.003923 | 0.004271 |
| Deflaction 21 mm | 0.002466 | 0.002711 | 0.003116 | 0.003441 |
| Deflaction 23 mm | 0.002106 | 0.002318 | 0.002684 | 0.002976 |
| Deflaction 25 mm | 0.001601 | 0.001803 | 0.002133 | 0.002407 |

With the method according to this invention the following total stiffness values were determined for TREAD C (with modulus G=1):

$K_x$=2345 N/mm $K_y$=2412 N/mm $K_t$=81 N*m/degree $K_y/K_x$=1.03

These values were calculated with modulus G=1, dimensions of the contact area as illustrated in FIG. 2, with a vertical load Q=268 kg (2680 N) and an inflation pressure of 2.2 bar.

The values shown fall within the following optimal value fields:

$K_x$=2,300–2,500 N/mm $K_y$=2,400–2,600 N/mm $K_t$=80–88 N*m/degree $K_y/K_x$=0.98–1.05

Figure 6:
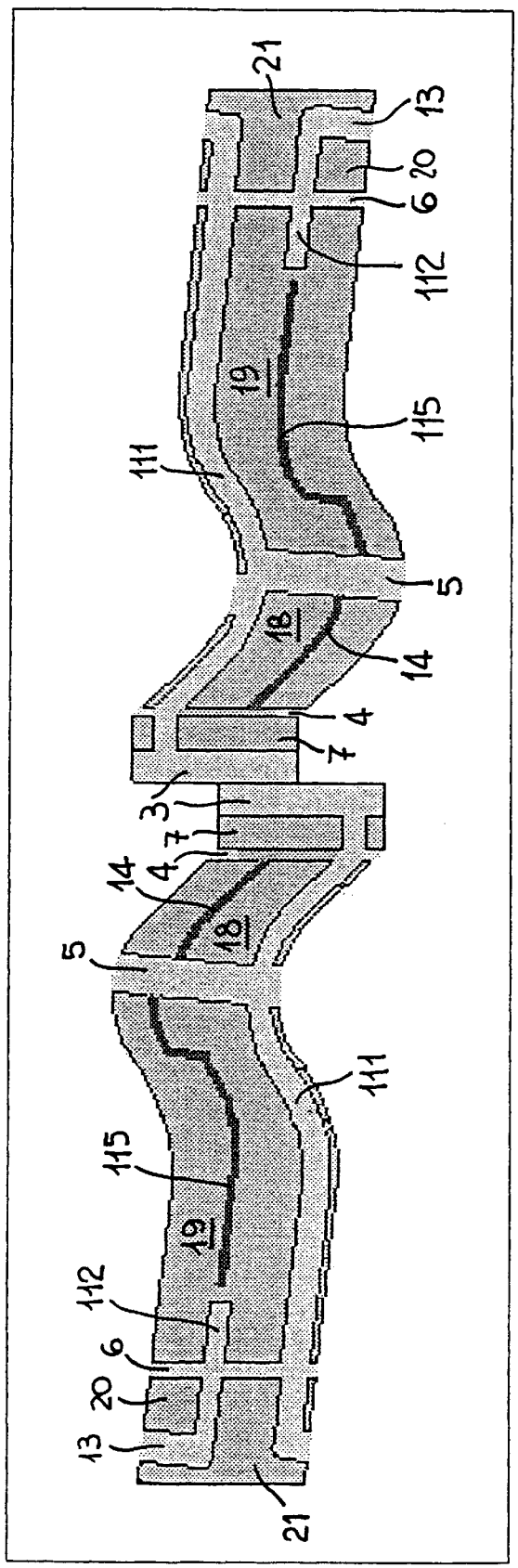
FIG. 6 illustrates (enlarged scale) a discrete area corresponding to one pitch of a first reference tread.
Figure 7A:
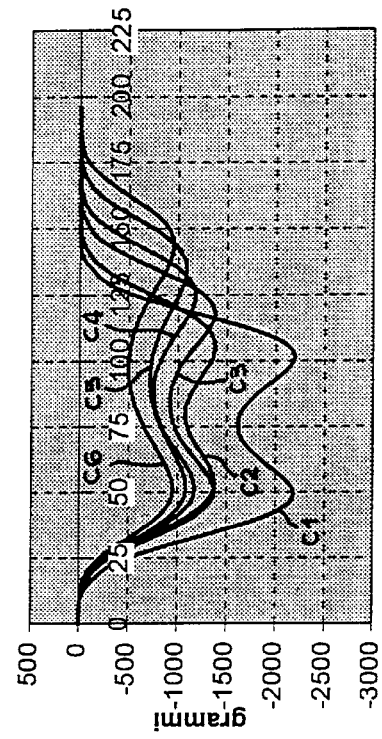
FIGS. 7a, 7b, 7c and 7d illustrate the amplitude of "basic curves" in four types of discrete areas, corresponding to four pitches, of a contact area of the tread illustrated in FIG. 6.
Figure 7B:
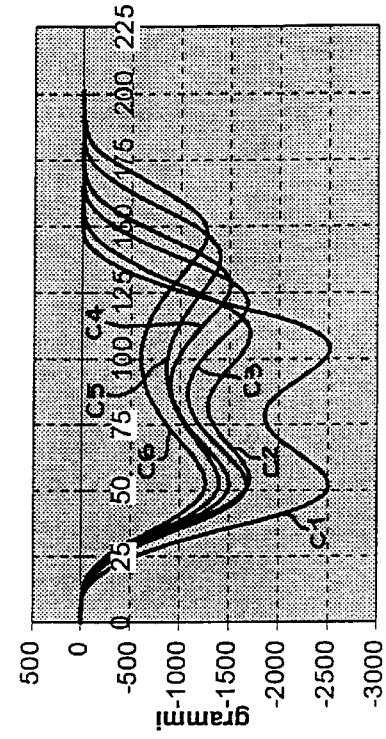
Figure 7C:
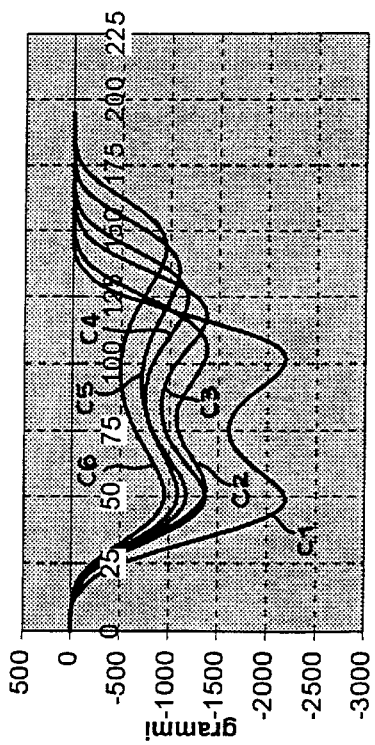
Figure 7D:
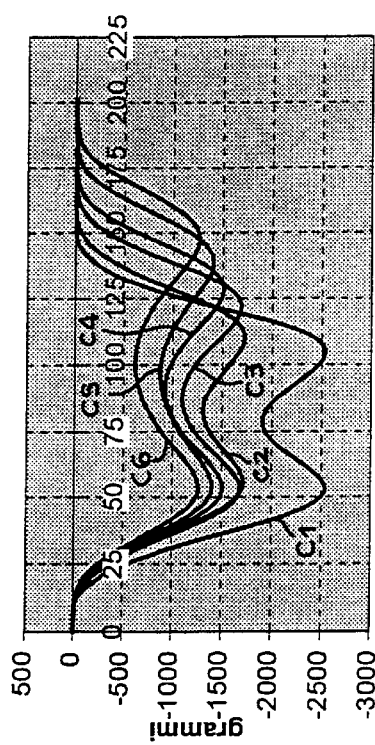

TREAD C represents the result attained with the method of optimization of this invention starting from a tyre with a conventional carcass structure and conventional tread pattern, identified by the marking 175/65 R14 TREAD A and illustrated in FIG. 6.

TREAD A has equal parts to those of tread 1 (TREAD C) denoted by the same numbers, with the exception of transversal grooves 111 and 112, with dimensions different from those of grooves 11 and 12 of tread 1, a sipe 115 instead of sipes 15 and 16 of tread 1, a channel slant 5 with respect to the vertical greater than that of tread 1 and a pitch bend more acute than tread 1.

By way of comparison with TREAD C, FIGS. 7a, 7b, 7c and 7d illustrate the "basic curve" graphs of four pitches (A, B, C and D) for TREAD A; Table 3 attached illustrates the ratio values (PN) between "Ps" and "s" and Table 4 attached illustrates the ratio values (FN) between "Ftass" and "Car V".

Figure 8:
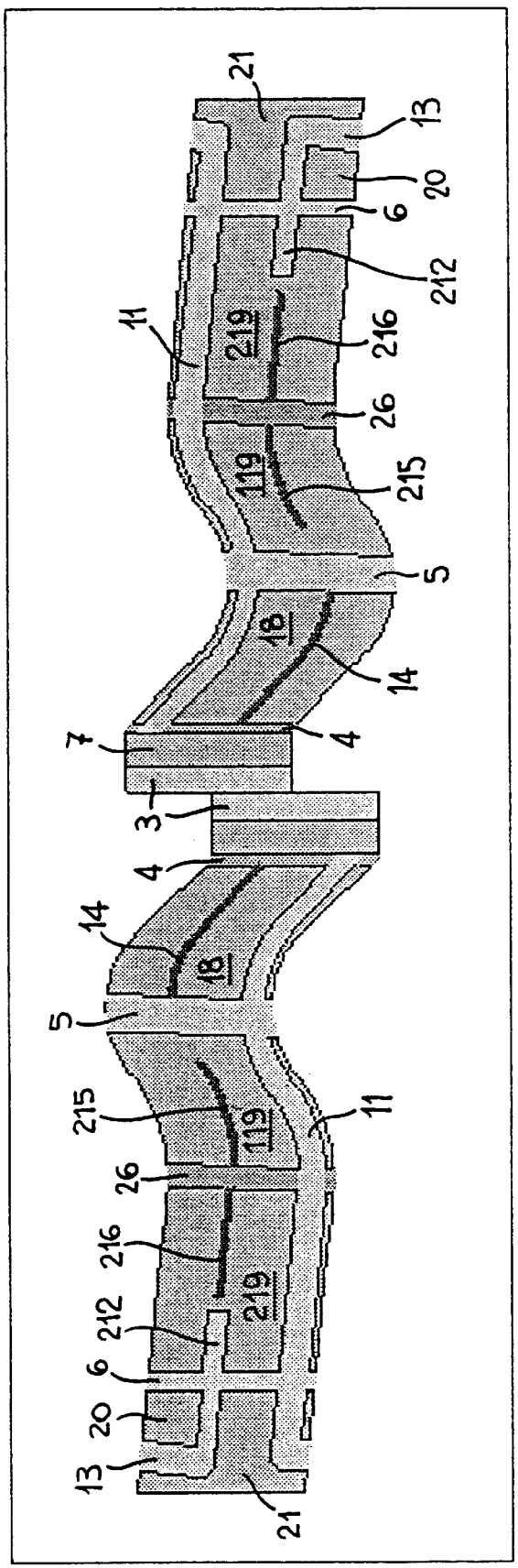
FIG. 8 illustrates (enlarged scale) a discrete area corresponding to a pitch of a second reference tread.

Another comparison involved analysing a second tyre, identified with the marking 175/65 R14 TREAD B and illustrated in FIG. 8. TREAD B has equal parts to those of tread 1 (TREAD C), denoted by the same numbers, with the exception of an additional longitudinal groove 26 with respect to tread 1, two rows of blocks 119 and 219 instead of the row of blocks 19 of tread 1, sipes 215 and 216 instead of sipes 15 and 16 and a transversal groove 212 with different dimensions from those of groove 12 of tread 1.

FIGS. 9a, 9b, 9c and 9d illustrate the "basic curve" graphs for TREAD B of four types of discrete areas, or pitches, (A, B, C and D); Table 5 attached illustrates the ratio values (PN) between "Ps" and "s" and Table 6 attached illustrates the ratio values (FN) between "Ftass" and "Car V".

The ratio values of "Ps"/"s" and "Ftass"/"Car V" of TREAD A represent the upper excursion limit of the "basic curves" of TREAD C, again with reference to a 175/65 R14 size tyre.

TABLE 3

PN = Ps/s 175/65 R 14 TREAD A

|  | Pitch A | Pitch B | Pitch C | Pitch D |
|---|---|---|---|---|
| Deflaction 15 mm | 0.0797 | 0.0797 | 0.0819 | 0.0819 |
| Deflaction 17 mm | 0.0840 | 0.0840 | 0.0862 | 0.0862 |
| Deflaction 19 mm | 0.0883 | 0.0883 | 0.0926 | 0.0926 |
| Deflaction 21 mm | 0.0926 | 0.0926 | 0.0969 | 0.0948 |
| Deflaction 23 mm | 0.0969 | 0.0991 | 0.1012 | 0.1012 |
| Deflaction 25 mm | 0.1034 | 0.1034 | 0.1055 | 0.1055 |

TABLE 4

FN = Ftass/Car V 175/65 R 14 TREAD A

|  | Pitch A | Pitch B | Pitch C | Pitch D |
|---|---|---|---|---|
| Deflaction 15 mm | 0.007259 | 0.007289 | 0.008412 | 0.008354 |
| Deflaction 17 mm | 0.004051 | 0.004048 | 0.005063 | 0.005015 |
| Deflaction 19 mm | 0.003616 | 0.003618 | 0.004439 | 0.004414 |
| Deflaction 21 mm | 0.002800 | 0.002807 | 0.003578 | 0.003567 |
| Deflaction 23 mm | 0.002375 | 0.002372 | 0.003062 | 0.003055 |
| Deflaction 25 mm | 0.001906 | 0.001906 | 0.002519 | 0.002522 |

TABLE 5

PN = Ps/s 175/65 R 14 TREAD B

|  | Pitch A | Pitch B | Pitch C | Pitch D |
|---|---|---|---|---|
| Deflaction 15 mm | 0.0797 | 0.0797 | 0.0819 | 0.0819 |
| Deflaction 17 mm | 0.0840 | 0.0840 | 0.0862 | 0.0862 |
| Deflaction 19 mm | 0.0883 | 0.0883 | 0.0926 | 0.0926 |
| Deflaction 21 mm | 0.0926 | 0.0926 | 0.0948 | 0.0969 |
| Deflaction 23 mm | 0.0991 | 0.0991 | 0.1012 | 0.1012 |
| Deflaction 25 mm | 0.1034 | 0.1034 | 0.1055 | 0.1055 |

TABLE 6

FN = Ftass/Car V 175/65 R 14 TREAD B

|  | Pitch A | Pitch B | Pitch C | Pitch D |
|---|---|---|---|---|
| Deflaction 15 mm | 0.007241 | 0.007132 | 0.008248 | 0.008450 |
| Deflaction 17 mm | 0.004012 | 0.004006 | 0.004992 | 0.004939 |
| Deflaction 19 mm | 0.003593 | 0.003581 | 0.004374 | 0.004342 |
| Deflaction 21 mm | 0.002834 | 0.002810 | 0.003571 | 0.003492 |
| Deflaction 23 mm | 0.002422 | 0.002407 | 0.003075 | 0.003005 |
| Deflaction 25 mm | 0.002010 | 0.001998 | 0.002585 | 0.002505 |

Tables 7 and 8 attached illustrate the values of ratios "Ps"/"s" and "Ftass"/"Car V" representing the lower excursion limit of the "basic curves" of TREAD C, again with reference to a 175/65 R14 size tyre.

By comparing the ratios "Ftass"/"Car V" for the three treads, it results that the values of TREAD C (Table 2) area lower and have considerably lower variations with respect to those of TREAD A (Table 4) and TREAD B (Table 6). This demonstrates that TREAD C has an arrangement of full and empty elements which is optimized to attain substantially lower forces at the hub.

TABLE 7

PN = Ps/s 175/65 R 14

|  | Pitch A | Pitch B | Pitch C | Pitch D |
|---|---|---|---|---|
| Deflaction 15 mm | 0.0991 | 0.0991 | 0.1012 | 0.1034 |
| Deflaction 17 mm | 0.1012 | 0.1034 | 0.1055 | 0.1077 |
| Deflaction 19 mm | 0.1077 | 0.1077 | 0.1099 | 0.1120 |
| Deflaction 21 mm | 0.1120 | 0.1120 | 0.1142 | 0.1163 |
| Deflaction 23 mm | 0.1163 | 0.1185 | 0.1206 | 0.1228 |
| Deflaction 25 mm | 0.1228 | 0.1228 | 0.1249 | 0.1271 |

TABLE 8

FN = Ftass/Car V 175/65 R 14

|  | Pitch A | Pitch B | Pitch C | Pitch D |
|---|---|---|---|---|
| Deflaction 15 mm | 0.005288 | 0.005607 | 0.007136 | 0.007499 |
| Deflaction 17 mm | 0.003150 | 0.003419 | 0.004069 | 0.004384 |
| Deflaction 19 mm | 0.002825 | 0.003052 | 0.003572 | 0.00390 |
| Deflaction 21 mm | 0.002078 | 0.002277 | 0.002653 | 0.002923 |
| Deflaction 23 mm | 0.001768 | 0.001932 | 0.002257 | 0.002478 |
| Deflaction 25 mm | 0.001226 | 0.001361 | 0.001599 | 0.001781 |

What is claimed is:

1. A method for determining preselected performance characteristics of a tread of a tyre, comprising ride comfort, noise, and handling; wherein a longitudinal direction, a transversal direction, and a vertical direction are associated with the tread; wherein the tread has a preselected thickness and a preselected circumferential development; wherein the tread comprises a preselected rubber compound and blocks and grooves having at least a preselected pitch; and wherein each portion of the tread in contact with a road surface comprises a contact area; comprising the steps of:

a) dividing the tread into a 3-D grid of full cells and empty cells of preselected dimensions;

b) identifying piles of the cells in the grid, each pile of cells having a base area equal to that of a cell and a height equal to the thickness of the tread, the piles of cells being full, partially full, or empty;

c) identifying a group of the piles of cells present under a contact area;

d) determining a stiffness value in the longitudinal direction and a stiffness value in the transversal direction for each pile of cells in the contact area;

e) identifying families of discrete areas in the contact area, each discrete area of each family having preselected dimensions in the longitudinal direction and in the transversal direction;

f) dividing the contact area in transversal strips with a preselected length in the longitudinal direction, each transversal strip comprising a set of the piles of cells;

g) determining a stiffness value per unit of length in the longitudinal direction and a stiffness value per unit of length in the transversal direction for each of the transversal strips, by summing the stiffness values in the longitudinal direction and the stiffness values in the transversal direction of the piles of cells of the set, respectively;

h) assigning a preselected deformation state to each of the transversal strips;

i) determining at least one force per unit of length associated with each transversal strip by means of a preselected function linking one of the stiffness values and the deformation state;

j) summing preselected forces per unit of length of all the transversal strips associated with a discrete area to attain at least one preselected single force acting in one of the longitudinal and transversal directions;

k) determining at least one total force associated with the contact area by means of a suitable summation of preselected single forces associated with all the discrete areas of the contact area, the total force being representative of at least one of the performance characteristics;

l) repeating the steps from c) to k) for all the portions of the tread which are arranged in succession on the circumferential development and come in contact with the road surface in an entire revolution of the tyre by means of respective contact areas to attain a plurality of total forces associated with all the contact areas of the tread; and m) evaluating the pattern of the plurality of total forces to establish whether the arrangement of the full cells and empty cells in the 3-D grid is substantially uniform along the circumferential development and generates total forces with substantially equal and constant values, so as to optimize at least one preselected performance characteristic of the tread.

2. The method of claim 1, wherein the stiffness value in the longitudinal direction and the stiffness value in the transversal direction are determined according to the following relationships:

$$c_{xj} = \eta_x G A_p / h,$$

and $$c_{yj} = \eta_y G A_p / h;$$

where $c_{xj}$ is the stiffness value in the longitudinal direction, $\eta_x$ is a coefficient of efficiency in the longitudinal direction, G is a preselected value for the modulus of elasticity in shear of the compound, $A_p$ is the area of the pile of cells, and h is the height of the pile of cells; $c_{yj}$ is the stiffness value in the transversal direction and $\eta_y$ is a coefficient of efficiency in the transversal direction; wherein the coefficients of efficiency $\eta_x$ and $\eta_y$ depend on the respective slenderness ratios $\lambda_{jx}$ and $\lambda_{jy}$—which, in turn, respectively depend on the ratio between the length of the pile of cells in the longitudinal direction and the height of the pile of cells and between the width of the pile of cells in the transversal direction and the height of the pile of cells—and on a shape coefficient which is a function of a position of the pile of cells in the grid.

3. The method of claim 1, wherein each aforesaid discrete area has a length in the longitudinal direction which is equal to the pitch of the tread.

4. The method of claim 1, wherein the length of each transversal strip is equal to a unit of length of the stiffness value per unit of length in the longitudinal direction and the stiffness value per unit of length in the transversal direction.

5. The method of claim 1, wherein the aforesaid steps from i) to l), total longitudinal forces are determined by means of the stiffness values per unit of length in the longitudinal direction of the strips and by means of a triangular longitudinal shearing deformation state of the tread, wherein the longitudinal deformation is null at the start of the footprint area and maximum at the end of the contact area.

6. The method of claim 1, wherein the aforesaid steps from i) to l), total transversal forces are determined by means of the stiffness values per unit of length in the transversal direction of the strips and by means of a triangular transversal shearing deformation state of the tread, wherein the transversal deformation is null at the start of the contact area and maximum at the end of the contact area.

7. The method of claim 5, wherein total longitudinal stiffness values associated with the contact areas of the tread are determined.

8. The method of claim 6, wherein total transversal stiffness values associated with the contact areas of the tread are determined.

9. The method of claim 1, wherein total torsional stiffness values associated with the contact areas of the tread are determined, further comprising the steps of:

n) identifying plane elements of the piles of cells under the contact area;

o) imposing a rotation on the contact area with respect to its centre of gravity;

p) determining the slip of each plane element in the contact area;

q) splitting the slip into a longitudinal component and a transversal component;

r) multiplying the longitudinal slip component by the stiffness value in the longitudinal direction and the transversal slip component by the stiffness value in the transversal direction to obtain elementary forces which, multiplied by the offset of the plane element with respect to the centre of gravity, generate torque values; and s) summing the torque values to obtain a total torsional moment which, linked with the rotation, results in the total torsional stiffness for each contact area.

10. The method of claim 1, wherein the aforesaid steps from i) to l), total longitudinal forces are determined by means of the stiffness values per unit of length in the longitudinal direction of the strips and by means of a triangular longitudinal shearing deformation state of the tread, where the longitudinal deformation is null at the start of the footprint area and maximum at the end of the contact area, and total transversal forces are determined by means of the stiffness values per unit of length in the transversal direction of the strips and by means of a triangular transversal shearing deformation state of the tread, where the transversal deformation is null at the start of the contact area and maximum at the end of the contact area; wherein total longitudinal stiffness values and total transversal stiffness values associated with the contact areas of the tread are determined; and wherein the ratio of the total transversal stiffness values to the total longitudinal stiffness values is between 0.98 and 1.05.

11. The method of claim 9, wherein the aforesaid steps from i) to l), total longitudinal forces are determined by means of the stiffness values per unit of length in the longitudinal direction of the strips and by means of a triangular longitudinal shearing deformation state of the tread, where the longitudinal deformation is null at the start of the footprint area and maximum at the end of the contact area, and total transversal forces are determined by means of the stiffness values per unit of length in the transversal direction of the strips and by means of a triangular transversal shearing deformation state of the tread, where the transversal deformation is null at the start of the contact area and maximum at the end of the contact area; wherein total longitudinal stiffness values and total transversal stiffness values associated with the contact areas of the tread are determined; and wherein the total longitudinal stiffness values are between 2,300 N/mm and 2,500 N/mm, the total transversal stiffness values are between 2,400 N/mm and 2,600 N/mm, and the total torsional stiffness values are between 80 N-m/degree and 88 N-m/degree.

12. The method of claim 1, wherein the piles of cells in the 3-D grid form a histogram in which a preselected character is associated with each pile of cells, the histogram being included in an optimal field delimited by a preselected lower surface and by a preselected upper surface.

13. The method of claim 7, wherein the piles of cells in the 3-D grid form a histogram in which a preselected character is associated with each pile of cells, the histogram being included in an optimal field delimited by a preselected lower surface and by a preselected upper surface; and wherein the histogram optimizes the total longitudinal stiffness values, making the total longitudinal forces assume a mean value which is lower than a preselected limit to thus minimize the noise output by the tread and optimizing ride comfort.

14. The method of claim 8, wherein the piles of cells in the 3-D grid form a histogram in which a preselected character is associated with each pile of cells, the histogram being included in an optimal field delimited by a preselected lower surface and by a preselected upper surface; and wherein the histogram maximizes the total transversal stiffness values, making the total transversal forces assume values which are higher than a preselected limit to thus optimize the tread with reference to handling.

15. The method of claim 9, wherein the piles of cells in the 3-D grid form a histogram in which a preselected character is associated with each pile of cells, the histogram being included in an optimal field delimited by a preselected lower surface and by a preselected upper surface, and wherein the histogram maximizes the total torsional stiffness values in the contact areas, making the total torsional moments of the contact areas assume values which are higher than a preselected limit to thus optimize the tread with reference to handling.

16. A tyre provided with a tread having optimal characteristics, with reference to preselected performance characteristics, comprising ride comfort, noise, and handling; wherein a longitudinal direction, a transversal direction, and a vertical direction are associated with the tread; wherein the tread has a preselected thickness and a preselected circumferential development; wherein the tread comprises a preselected rubber compound and blocks and grooves having at least a preselected pitch; wherein each portion of the tread in contact with a road surface comprises a contact area;

wherein the tread is divisible into a 3-D grid of full cells and empty cells of preselected dimensions; wherein the grid piles of the cells are identified, each pile of cells having a base area equal to that of one cell and height equal to the thickness of the tread; wherein the piles of cells being full, partially full, or empty; wherein a group of the piles of being identifiable under each contact area; wherein each pile of cells having a stiffness value in the longitudinal direction and a stiffness value in the transversal direction; wherein discrete areas with a preselected length in the longitudinal direction and a preselected width in the transversal direction are identifiable in the contact area, the contact area being divisible into transversal strips with a preselected length in the longitudinal direction;

wherein each transversal strip comprises a set of the piles of cells and having a stiffness value per unit of length in the longitudinal direction and a stiffness value per unit of length in the transversal direction determined by the summation, respectively, of the stiffness values in the longitudinal direction and the stiffness values in the transversal direction of the piles of cells in the set;

wherein at least one force per unit of length being associated with each transversal strip which depends on one of the stiffness values per unit of length and on a preselected state of deformation of the transversal strip; wherein at least one single force consisting of the sum of preselected forces per unit of length of all the transversal strips of the discrete area is associated with each discrete area;

wherein a total force consisting of the sum of preselected single forces of all the discrete areas of the contact area are associated with each contact area, the total force being representative of at least one of the performance characteristics; and wherein the full and empty cells have a substantially uniform arrangement along the circumferential development of the tread and generate total forces associated with all the contact areas of all the portions of the tread in contact during one entire revolution, having values substantially equal and constant so as to optimize at least one preselected performance characteristic of the tread.

17. The tyre of claim 16, wherein the stiffness value in the longitudinal direction and the stiffness value in the transversal direction are determined according to the following relationships:

$$c_{xj} = \eta_x G A_p / h,$$

and $$c_{yj} = \eta_y G A_p / h;$$

where $c_{xj}$ is the stiffness value in the longitudinal direction, $\eta_x$ is a coefficient of efficiency in the longitudinal direction, G is a preselected value for the modulus of elasticity in shear of the compound, $A_p$ is the area of the pile of cells, and h is the height of the pile of cells; $c_{yj}$ is the stiffness value in the transversal direction and $\eta_y$ is a coefficient of efficiency in the transversal direction; wherein the coefficients of efficiency $\eta_x$ and $\eta_y$ depend on the respective slenderness ratios $\lambda_{jx}$ and $\lambda_{jy}$—which, in turn, respectively depend on the ratio between the length of the pile of cells in the longitudinal direction and the height of the pile of cells and between the width of the pile of cells in the transversal direction and the height of the pile of cells—and on a shape coefficient which is a function of a position of the pile of cells in the grid.

18. The tyre of claim 16, wherein each aforesaid discrete area has a length in the longitudinal direction which is equal to the pitch of the tread.

19. The tyre of claim 16, wherein the length of each transversal strip is equal to a unit of length of the stiffness value per unit of length in the longitudinal direction and the stiffness value per unit of length in the transversal direction.

20. The tyre of claim 16, wherein a total longitudinal force is associated with each contact area.

21. The tyre of claim 16, wherein a total transversal force is associated with each contact area.

22. The tyre of claim 20, wherein a total longitudinal stiffness value is associated with each contact area.

23. The tyre of claim 21, wherein a total transversal stiffness value is associated with each contact area.

24. The tyre of claim 16, wherein a total longitudinal force, a total transversal force, and a total torsional stiffness value are associated with each contact area.

25. The tyre of claim 16, wherein a total longitudinal force, a total longitudinal stiffness value, a total transversal force, a total transversal stiffness value, and a total torsional stiffness value are associated with each contact area; and wherein the total longitudinal stiffness values are between 2,300 N/mm and 2,500 N/mm, the total transversal stiffness values are between 2,400 N/mm and 2,600 N/mm, and the total torsional stiffness values are between 80 N-m/degree and 88 N-m/degree.

26. The tyre of claim 25, wherein the ratio of the total transversal stiffness values to the total longitudinal stiffness values is between 0.98 and 1.05.

27. The tyre of claim 16, wherein the piles of cells in the 3-D grid form a histogram in which a preselected character is associated with each pile of cells, the histogram being included in an optimal field delimited by a preselected lower surface and by a preselected upper surface.

28. The tyre of claim 22, wherein the piles of cells in the 3-D grid form a histogram in which a preselected character is associated with each pile of cells, the histogram being included in an optimal field delimited by a preselected lower surface and by a preselected upper surface; and wherein the histogram optimizes the total longitudinal stiffness values, making the total longitudinal forces assume a mean value which is lower than a preselected limit to thus minimize the noise output by the tread and optimizing ride comfort.

29. The tyre of claim 23, wherein the piles of cells in the 3-D grid form a histogram in which a preselected character is associated with each pile of cells, the histogram being included in an optimal field delimited by a preselected lower surface and by a preselected upper surface; and wherein the histogram maximizes the total transversal stiffness values, making the total transversal forces assume values which are higher than a preselected limit to thus optimize the tread with reference to handling.

30. The tyre of claim 24, wherein the piles of cells in the 3-D grid form a histogram in which a preselected character is associated with each pile of cells, the histogram being included in an optimal field delimited by a preselected lower surface and by a preselected upper surface; and wherein the histogram maximizes the total torsional stiffness values in the contact areas, making the total torsional moments of the contact areas assume values which are higher than a preselected limit to thus optimize the tread with reference to handling.

31. A tyre as in any one of claims 16–30, wherein the tread comprises a central longitudinal groove, a first, a second, and a third lateral longitudinal groove, on the left and on the right, transversal grooves and portions of transversal grooves, on the left and on the right, connected by portions of longitudinal grooves; the central longitudinal groove and each first lateral longitudinal groove delimiting a rib; each first and second lateral longitudinal groove and the transversal grooves delimiting a central internal row of first blocks; each second and third lateral longitudinal groove, the transversal grooves, and the portions of transversal grooves delimiting a central external row of second blocks; the third longitudinal groove, the portions of longitudinal grooves, the transversal grooves, and the portions of transversal grooves delimiting a shoulder row of third and fourth blocks; each of the first blocks comprising a transversal sipe; and each of the second blocks comprising two transversal sipes.

32. The tyre of claim 31, wherein the tread has, with a modulus of elasticity in shear equal to 1 N/mm$^2$, total longitudinal stiffness values of approximately 2,345 N/mm; total transversal stiffness values of approximately 2,412 N/mm; and total torsional stiffness values of approximately 81 N-m/degree.

33. The tyre of claim 32, wherein the tread has, with a modulus of elasticity in shear equal to 1 N/mm$^2$, a ratio of the total transversal stiffness values to the total longitudinal stiffness values of approximately 1.03.

34. A tyre provided with a tread having optimal characteristics, with reference to preselected performance characteristics, comprising ride comfort, noise, and handling; wherein a longitudinal direction, a transversal direction, and a vertical direction are associated with the tread; wherein the tread has a preselected thickness and a preselected circumferential development; wherein the tread comprises a preselected rubber compound and blocks and grooves having at least a preselected pitch; wherein each portion of the tread in contact with a road surface comprises a contact area; wherein a total longitudinal stiffness value, a total transversal stiffness value, and a total torsional stiffness value are associated with each contact area; and wherein the total longitudinal stiffness values are between 2,300 N/mm and 2,500 N/mm, the total transversal stiffness values are between 2,400 N/mm and 2,600 N/mm, and the total torsional stiffness values are between 80 N-m/degree and 88 N-m/degree.

35. The tyre of claim 34, wherein the ratio of the total transversal stiffness values to the total longitudinal stiffness values is between 0.98 and 1.05.

36. The tyre of claim 34, wherein the tread has, with a modulus of elasticity in shear equal to 1 N/mm$^2$, total longitudinal stiffness values of approximately 2,345 N/mm.

37. The tyre of claim 34, wherein the tread has, with a modulus of elasticity in shear equal to 1 N/mm$^2$, total transversal stiffness values of approximately 2,412 N/mm.

38. The tyre of claim 34, wherein the tread has, with a modulus of elasticity in shear equal to 1 N/mm$^2$, total torsional stiffness values of approximately 81 N-m/degree.

39. The tyre of claim 34 or 35, wherein the ratio of the total transversal stiffness values to the total longitudinal stiffness values is approximately 1.03.

* * * * *

UNITED STATES PATENT AND TRADEMARK OFFICE
CERTIFICATE OF CORRECTION

PATENT NO. : 6,539,788 B1
DATED : April 1, 2003
INVENTOR(S) : Federico Mancosu et al.

It is certified that error appears in the above-identified patent and that said Letters Patent is hereby corrected as shown below:

Column 19,
Line 54, "of being" should read -- of cells being --.

Signed and Sealed this

Twenty-second Day of March, 2005

JON W. DUDAS
*Director of the United States Patent and Trademark Office*